US008041962B2

(12) United States Patent
Sugita

(10) Patent No.: US 8,041,962 B2
(45) Date of Patent: Oct. 18, 2011

(54) INFORMATION PROCESSING DEVICE, METHOD OF CONTROLLING THE DEVICE, COMPUTER READABLE MEDIUM, AND SECURITY SYSTEM

(75) Inventor: Hiroshi Sugita, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 780 days.

(21) Appl. No.: 12/038,008

(22) Filed: Feb. 27, 2008

(65) Prior Publication Data

US 2009/0089597 A1 Apr. 2, 2009

(30) Foreign Application Priority Data

Sep. 27, 2007 (JP) ................................ 2007-252528

(51) Int. Cl.
*G06F 1/32* (2006.01)

(52) U.S. Cl. ......................... 713/300; 713/320; 713/324

(58) Field of Classification Search .................. 713/300, 713/310, 320, 323, 324
See application file for complete search history.

(56) References Cited

U.S. PATENT DOCUMENTS

| | | | | |
|---|---|---|---|---|
| 6,285,406 | B1 * | 9/2001 | Brusky | 348/552 |
| 6,865,596 | B1 * | 3/2005 | Barber et al. | 709/208 |
| 7,406,612 | B2 * | 7/2008 | O'Connor et al. | 713/320 |
| 2003/0025599 | A1 * | 2/2003 | Monroe | 340/531 |
| 2004/0030531 | A1 * | 2/2004 | Miller et al. | 702/182 |
| 2005/0130709 | A1 * | 6/2005 | Muszkiewicz | 455/566 |
| 2005/0182612 | A1 * | 8/2005 | Anderson et al. | 703/18 |
| 2006/0053311 | A1 * | 3/2006 | Chary | 713/300 |

FOREIGN PATENT DOCUMENTS

| | | | |
|---|---|---|---|
| JP | 5-224787 | A | 9/1993 |
| JP | 8-011392 | A | 1/1996 |
| JP | 2000-056869 | A | 2/2000 |
| JP | 2006-272618 | A | 10/2006 |
| JP | 2007-144928 | A | 6/2007 |

OTHER PUBLICATIONS

Japanese Office Action dated Feb. 2, 2010 for Japanese Application No. 2007-252528 and English-language translation.

* cited by examiner

*Primary Examiner* — Mark Connolly
*Assistant Examiner* — Paul Yanchus, III
(74) *Attorney, Agent, or Firm* — Sughrue Mion, PLLC

(57) ABSTRACT

An information processing device includes a power control section and a function-suppressing section. The power control section switches between a predetermined mode and a low-power mode on the basis of a pre-specified setting condition relating to power consumption of the information processing device. The low-power mode is lower in electricity consumption quantities than the predetermined mode. When switching from the low-power mode to the predetermined mode in a period of operation of an external security apparatus, the function-suppressing section suppresses a part of functions of the device in the predetermined mode.

16 Claims, 9 Drawing Sheets

INFORMATION PROCESSING DEVICE, METHOD OF CONTROLLING THE DEVICE, COMPUTER READABLE MEDIUM, AND SECURITY SYSTEM

CROSS-REFERENCE TO RELATED APPLICATION

This application is based on and claims priority under 35 USC 119 from Japanese Patent Application No. 2007-252528 filed Sep. 27, 2007.

BACKGROUND

1. Technical Field

The present invention relates to an information processing device, a control method thereof, computer readable medium, and a security system.

2. Related Art

Heretofore, there have been information processing devices equipped with power-saving modes, which are capable of reducing power consumption. For example, a device is known, which can automatically alter a process of switching to a low-power mode, in which brightness of a display device is lowered and the like, or suchlike in accordance with a condition of usage by users.

Furthermore, a device is known that monitors a printing state of a printing device main body and, upon recognizing that the printing device main body is in any of at least three stable states, which differ in power consumption amounts, restricts power supplies to components of the printing device main body in accordance with the identified stable state.

SUMMARY

According to an aspect of the invention, a first information processing device includes: a power control section that switches between a predetermined mode and a low-power mode on the basis of a pre-specified setting condition relating to power consumption of the information processing device, the low-power mode being lower in a power consumption quantity than the predetermined mode; and a function-suppressing section that, when switching from the low-power mode to the predetermined mode in a time period of operation of an external security apparatus, suppresses at least one function of the information processing device in the predetermined mode.

BRIEF DESCRIPTION OF THE DRAWINGS

Exemplary embodiments of the present invention will be described in detail based on the following figures wherein.

DETAILED DESCRIPTION

First Exemplary Embodiment

Figure 1:
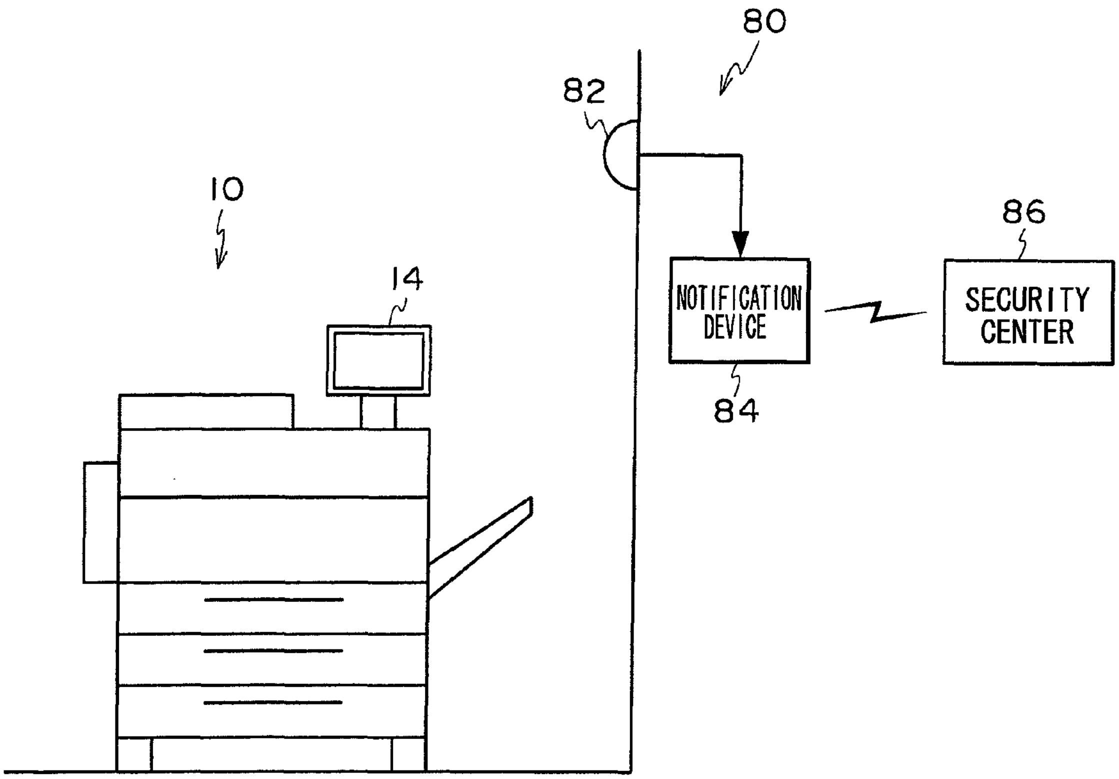
FIG. 1 is a diagram showing an exterior of an image forming device and schematic structure of a security system.

Herebelow, a first exemplary embodiment of the invention will be described. An image processing device is illustrated for the present exemplary embodiment as one example of exemplary embodiments of the image processing device of the invention. FIG. 1 shows the exterior of an image forming device 10 according to the present exemplary embodiment and schematic structure of a security system 80, which is provided at a room in which the image forming device 10 is disposed.

The image forming device 10 is connected to, for example, an unillustrated network, telephone system or the like. The image forming device 10 includes a printing function, for printing in accordance with printing data transmitted through the network, a fax transmission/reception function, a scanner function, for reading an original placed at the image forming device 10, and so forth.

The security system 80, as an example for the present exemplary embodiment, is structured to include a sensor 82, which detects light and sound at and above predetermined levels, and a notification device 84.

The security system 80 is set so as to operate in a time period when there is no reason for people to be coming in and out, for example, at night or the like. In this time period, if the sensor 82 senses light and/or sound over the predetermined levels, the notification device 84 notifies a security center 86 that an intruder is present, via a communication network.

Figure 2:
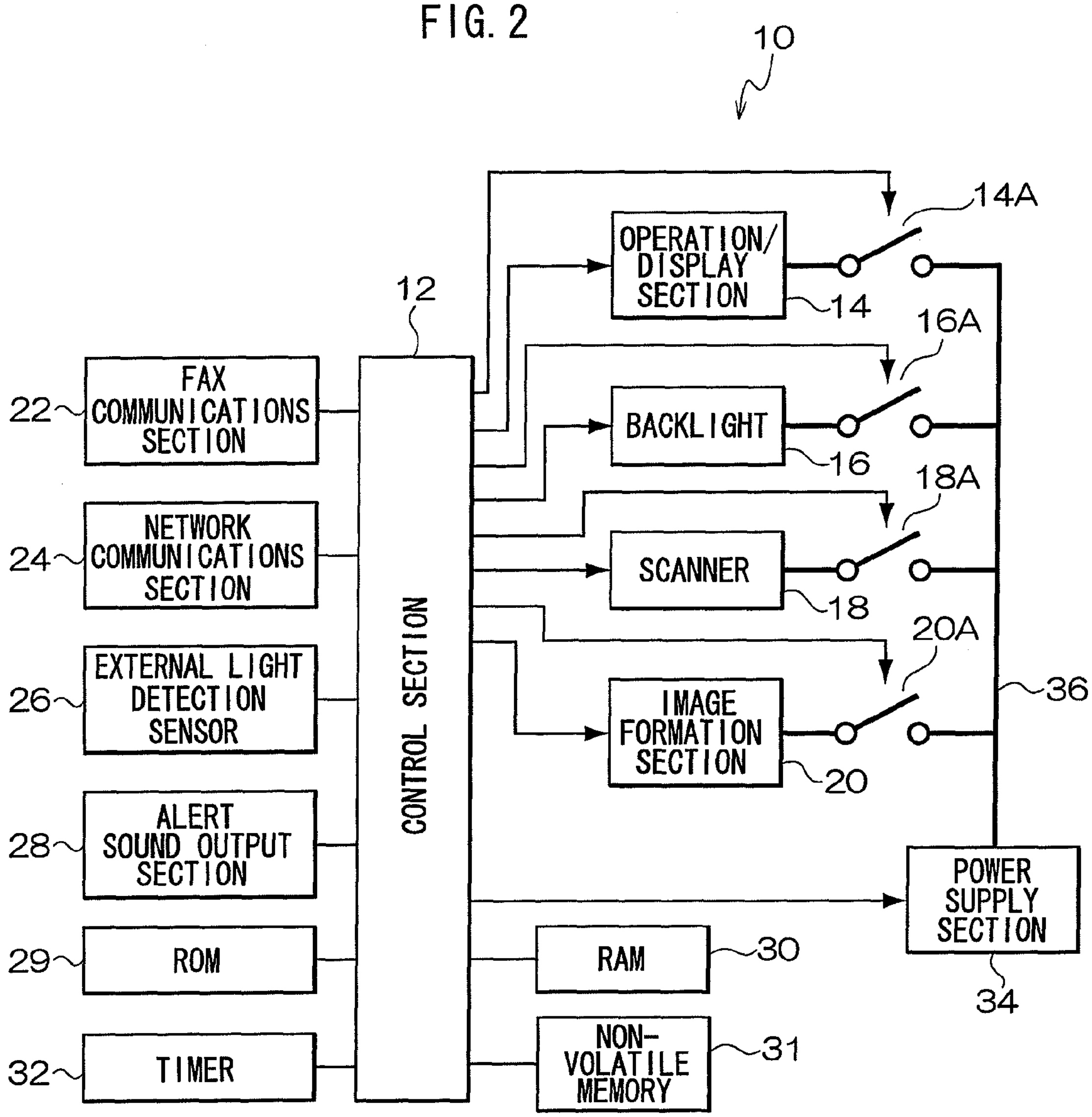
FIG. 2 is a schematic block diagram of the image forming device.

FIG. 2 shows a schematic structural diagram of the image forming device 10. As shown in FIG. 2, the image forming device 10 includes a control section 12 (for example, a central processing unit (CPU)), which performs overall control of various sections. The control section 12 is connected to: an operation/display section 14, a backlight 16, a scanner 18, an image formation section 20, a fax communications section 22, a network communications section 24, an external light detection sensor 26, an alert sound output section 28, a ROM (read-only memory) 29 which serves as a recording medium that memorizes basic programs such as an OS and the like, a RAM (random access memory) 30 which temporarily memorizes various kinds of data, a non-volatile memory 31 at which data can be overwritten and which is capable of storing data even when power is not being supplied, a timer 32, and a power supply section 34.

The operation/display section 14 is for implementing setting operations for the functions, and showing menu screens, setting states of the functions, and various screens which show operational conditions and suchlike of the device, such as a low-power mode, which will be described later, and the like. In the present exemplary embodiment, an example of an operation/display section which is structured with, for example, a touch panel that employs a liquid crystal display or the like, at which display content can be made visible by the backlight 16 lighting up, is used as the operation/display section 14. The operation/display section is not limited to the liquid crystal display referred to in the present exemplary embodiment, but could just as well be a section which uses devices such as LEDs or the like to implement displays with light. Setting operations of the functions include, for example, an operation for setting the period of operation of the security system 80, in order to switch into a function-suppressing mode when switching from the low-power mode, which will be described later, and so forth.

The backlight 16, for example, can be set to plural levels of brightness, and lights to a brightness at a level specified by the control section 12.

The scanner 18 is for reading an image recorded on an original that has been placed thereat, and is structured to include an unillustrated line CCD, a driving section which drives the line CCD, and the like.

Figure 3:
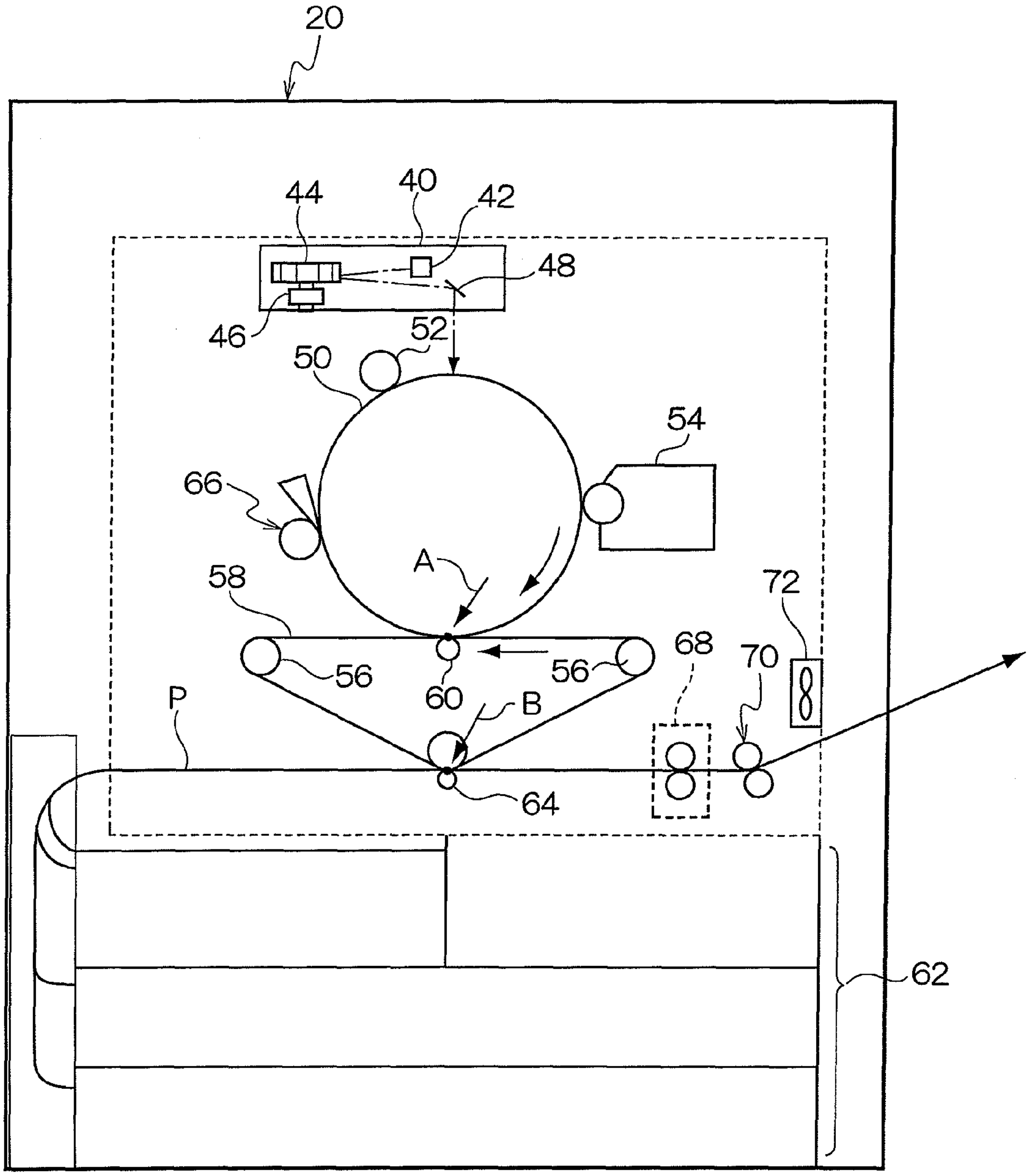
FIG. 3 is a schematic structural diagram of the image forming device.

The image formation section 20 forms an image on a recording medium with, for example, an "electrophotography" system and, as shown in FIG. 3, is structured to include a light scanning device 40.

As shown in FIG. 3, the light scanning device 40 is structured to include a laser light source 42, which outputs laser light in accordance with image information, a polygon mirror (a rotating multi-faced mirror) 44, a driving motor 46, a reflection mirror 48, and so forth. The laser light outputted from the laser light source 42 passes through an unillustrated optical system, which includes a collimator lens and suchlike, and is incident at a reflection surface of the polygon mirror 44. The polygon mirror 44 is driven to rotate by the driving motor 46, and the laser light is reflected by the reflection surface of the polygon mirror 44. The reflected laser light passes through an unillustrated optical system, with an f-θ lens or the like, is reflected in a direction toward a photosensitive drum 50 by the reflection mirror 48, and scans the photosensitive drum 50.

The photosensitive drum 50 is charged up by an electrostatic charging apparatus 52, and is scanned with laser light by the light scanning device 40 in accordance with an image. As a result, a latent image corresponding to the image is formed on the photosensitive drum 50. The latent image that has been formed is developed with toner by a developing apparatus 54. When the toner image that has been formed on the photosensitive drum 50 passes through a primary transfer position (indicated by arrow A in FIG. 3), the toner image is primary-transferred by a transfer apparatus 60 onto an intermediate transfer belt 58, which is driven by conveyance rollers 56.

As shown in FIG. 3, recording paper P is supplied one sheet at a time from a paper supply section 62, which is disposed at a lower portion of a device main body. The recording paper P is conveyed to a secondary transfer position of the intermediate transfer belt 58 (indicated by arrow B in FIG. 3), having been synchronized with the toner image that has been transferred onto the intermediate transfer belt 58, and the image on the intermediate transfer belt 58 is transferred onto the recording paper P by a transfer apparatus 64.

After transfer of the toner image, the photosensitive drum 50 is cleaned by a cleaning section 66, and is charged up by the electrostatic charging apparatus 52 for formation of the next image.

The recording paper P to which the toner image has been transferred from the intermediate transfer belt 58 is conveyed to a fixing apparatus 68, which is structured by heating rollers or the like. The toner image is fixed onto the recording paper P by heat and pressure from the fixing apparatus 68, and the recording paper P is ejected by ejection rollers 70.

A ventilation fan 72 is provided inside the image formation section 20. The ventilation fan 72 turns, for example, at a rotation speed corresponding to a temperature detected by an unillustrated sensor, so as to keep the detected temperature at a predetermined temperature. Thus, a temperature inside the device, which rises due to heating by the fixing apparatus 68, is lowered.

The fax communications section 22 is connected to an unillustrated telephone system, and transmits and receives faxes.

The network communications section 24 is connected to an unillustrated network such as a LAN or the like, and transmits and receives data to and from computers and the like that are connected to the network.

The external light detection sensor 26 is a light sensor which senses light outside of the image forming device 10. Judgements of, for example, switching between the low-power mode and a later-described predetermined mode, and the like, are implemented in accordance with levels of light detected by the external light detection sensor 26.

The alert sound output section 28 is for outputting a sound to alert that an error has occurred, for example, when a jam of recording paper has occurred in image formation operations or the like, for outputting a sound to alert that a job such as a print job or the like has finished, and for outputting sounds of operations of the operation/display section 14. The alert sound output section 28 may output alert sounds with plural output levels, and outputs an alert sound at an output level specified by the control section 12.

The non-volatile memory 31 memorizes various kinds of setting values and the like, relating to image formation settings and the like, which are set by a later-described control program, operations of the operation/display section 14, and the like.

The timer 32 is for measuring a duration when, for example, control for switching from a normal mode to the low-power mode or the like is to be implemented when there have been no operations by a user for more than a predetermined duration, and is for acquiring a current time.

The power supply section 34 supplies electric power to each of the operation/display section 14, the backlight 16, the scanner 18 and the image formation section 20, via a power line 36. The power line 36 is connected with the operation/display section 14, the backlight 16, the scanner 18 and the image formation section 20 via switches 14A, 16A, 18A and 20A, respectively. The control section 12 controls to turn power supplies to the respective sections on and off by on-off control of these switches.

The image forming device 10 as described above includes, as operation modes in relation to power consumption, a predetermined mode and a low-power mode, which suppresses power consumption amounts relative to the predetermined mode.

Predetermined modes include, for example, a normal mode which controls so as to enable maximum image formation capabilities rather than suppressing power consumption, a mode that corresponds to a low-power mode, in which power consumption amounts are lower than in the normal mode but larger than in the low-power mode, and suchlike. For the present exemplary embodiment, a case is described in which the predetermined mode is a normal mode.

Low-power modes include, for example, an energy-saving mode which suppresses power consumption of the device by turning off power supplies to each of the operation/display section 14, the backlight 16, the scanner 18 and the image formation section 20, a standby mode in which power is supplied to the image formation section 20—in order to keep a temperature of the fixing apparatus 68 at a predetermined temperature such that it is possible to start printing immediately when switching into the normal mode—and power supplies to other sections are turned off, and the like. That is, the control section 12 basically controls so as to enable maximum image forming capabilities in the normal mode, and so as to suppress power consumption, at least in comparison with the normal mode, in the low-power mode.

A condition for switching from the normal mode to the low-power mode may be, for example, in a case in which the time period of operation of the security system 80 has been specified, if the current time is within that period when there have been no operations by users for more than a predetermined duration. Other conditions for switching that can be applied include when a brightness of light detected by the external light detection sensor 26 is below a predetermined level, that is, illumination of the place in which the device is disposed has been turned off for the night or the like, and is at an ambient light level at which there would usually be no reason for people to be performing operations.

Meanwhile, conditions for switching from the low-power mode to the normal mode apply, for example: when the fax communications section 22 receives a fax from the telephone system; when there is a printing instruction to the network communications section 24 from the network; when the time period in which operations of the security system 80 stop and the like has been specified and the current time is at the end of the time period; when operations are performed by a user at the image forming device for sending a fax or the like; when the light detected by the external light detection sensor 26 exceeds a predetermined level, that is, in daytime when the brightness of the place in which the device is disposed is at an ambient light level at which people may perform operations; and so forth.

For example, if a fax is received at night or the like in a state in which the security system 80 is operating and the image forming device 10 is in the low-power mode, then in order to print the received fax, the image forming device 10 switches from the low-power mode to the normal mode at least temporarily. At this time, the backlight 16 that had been turned off illuminates and the operation/display section 14 brightens. If this brightness is above a predetermined level, the security system 80 may detect the brightness and give a false alarm that an irregularity has occurred. Moreover, if noise is produced by an operation of printing the received fax and, for example, noise produced by rotary driving of the polygon mirror 44 is at or above a predetermined level, the security system 80 may detect this noise and give a false alarm that an irregularity has occurred.

Accordingly, in the present exemplary embodiment, the period of operation of the security system 80 is memorized beforehand in the non-volatile memory 31 or the like, and if the image forming device 10 is to switch from the low-power mode to the normal mode when the timer 32 is in this time period, then the image forming device 10 switches to a function-suppressing mode. The function-suppressing mode is operated with functions being suppressed relative to the normal mode, such as, for example, the backlight 16 being kept switched off, the rotation speed of the polygon mirror 44 being lowered relative to the normal mode, and the like.

Figure 4:
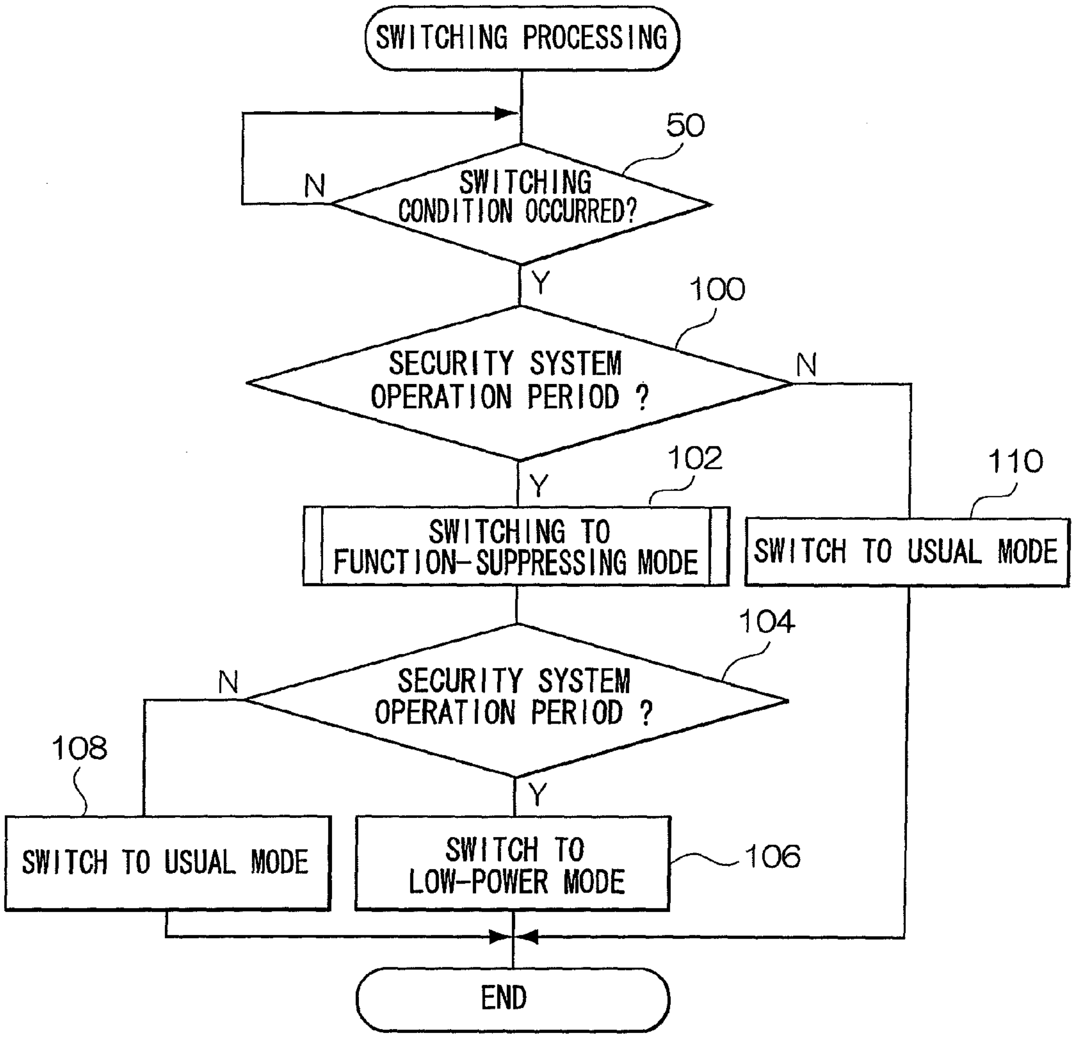
FIG. 4 is a flowchart of switching processing which is executed by a control section according to a first exemplary embodiment.

Next, operation of the present exemplary embodiment will be described with reference to the flowchart shown in FIG. 4 of control which is executed by the control section 12. The control shown in FIG. 4 is executed when in the low-power mode. For the present exemplary embodiment, an example is described in which the period of operation of the security system 80 has been specified and memorized in the non-volatile memory 31, the image forming device 10 is in the low-power mode in this period, and in the low-power mode, power supplies to the operation/display section 14, the backlight 16, the scanner 18 and the image formation section 20 are turned off.

Firstly, in step 50, it is verified whether or not a condition of switching from the low-power mode to the normal mode has arisen, such as when a fax is received or the like. If a switching condition has arisen, control proceeds to step 100. If a switching condition has not arisen, control returns to step 50.

In step 100, the current time is acquired from the timer 32, and it is judged whether or not this time is in the period of operation of the security system 80, which has been specified by a user. This judgment may be performed by the control section 12 with reference to the time period that was stored in the non-volatile memory 31 by the control section 12, but could just as well take a form in which a comparison section (not illustrated) is used, which compares the current time from the timer 32 with the time period memorized at the non-volatile memory 31, and a result of the comparison is sent to the control section 12. Then, if the current time is not in the period of operation of the security system 80, control proceeds to step 110 and the image forming device 10 switches into the normal mode. That is, the switches 14A, 16A, 18A and 20A are turned on, power is supplied from the power supply section 34 to the operation/display section 14, the backlight 16, the scanner 18 and the image formation section 20, and each section is instructed to operate in the normal mode. Hence, for example, the backlight 16 is lit with a brightness of usual times of use, and the image formation section 20 is set so as to perform printing operations at normal speeds.

On the other hand, if the current time is in the period of operation of the security system 80, control proceeds to step 102 and the image forming device 10 switches into the function-suppressing mode.

Figure 5:
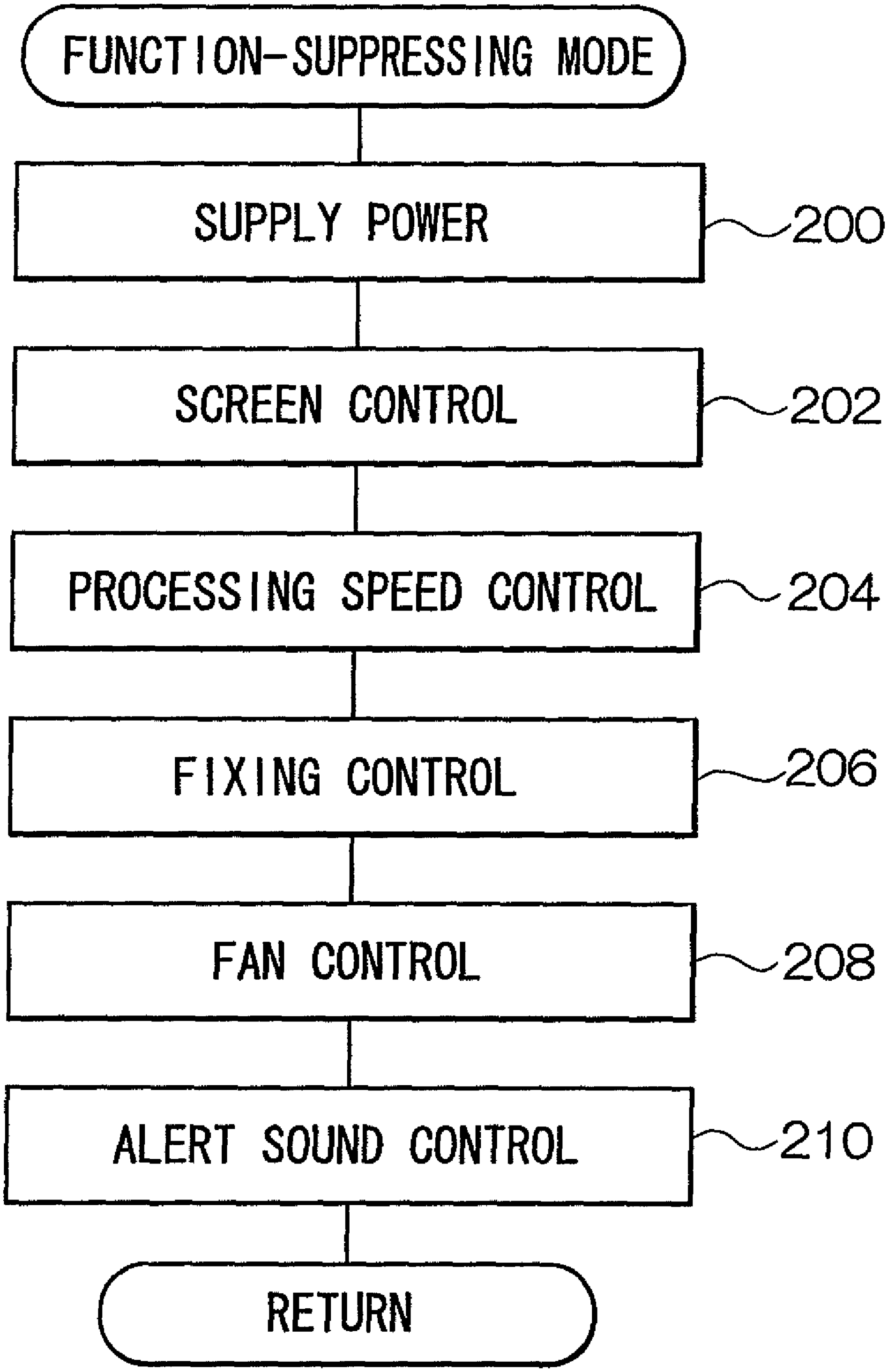
FIG. 5 is a flowchart of processing in a function-suppressing mode which is executed by the control section according to the first exemplary embodiment.

In processing for switching into the function-suppressing mode as shown in FIG. 5, firstly, in step 200, the switches 14A, 16A, 18A and 20A are turned on to supply power from the power supply section 34 to each section.

Figure 6A:
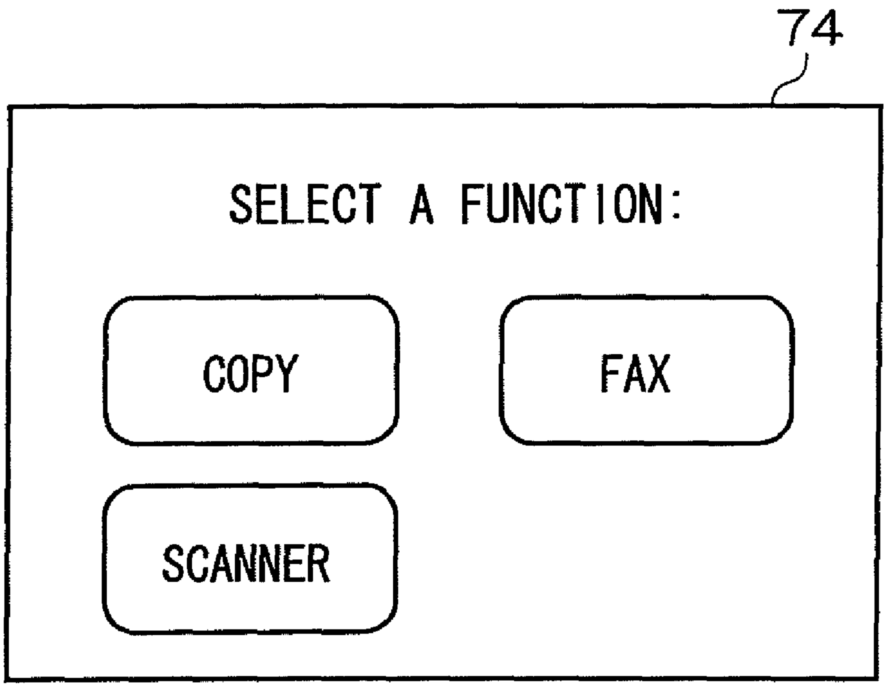
FIG. 6A is a view showing an example of a menu screen which is displayed at an operation/display section in a normal mode.
Figure 6B:
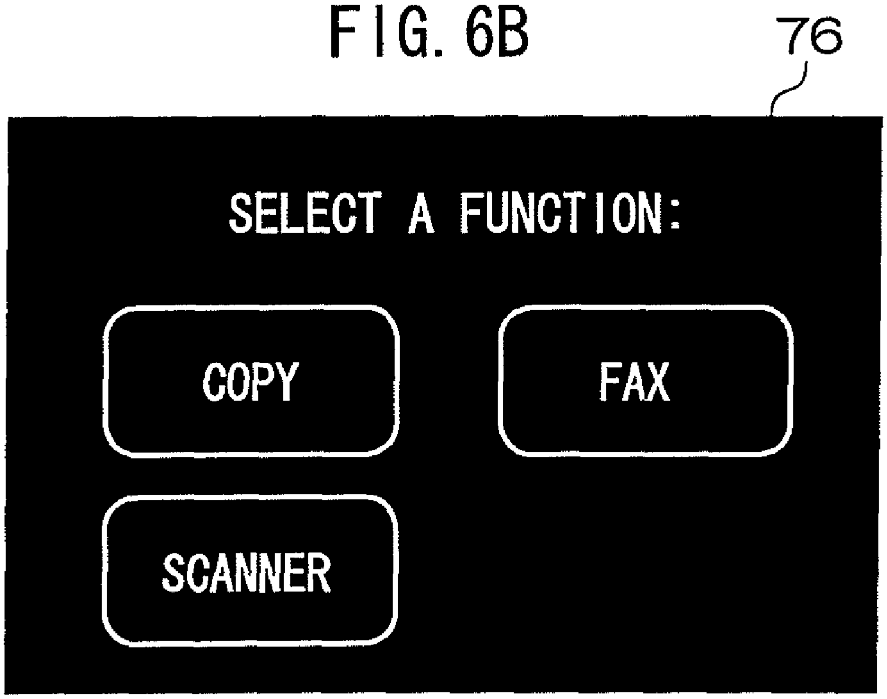
FIG. 6B is a view showing an example of a menu screen which is displayed at the operation/display section in the function-suppressing mode.

In step 202, predetermined screen control is performed. Specifically, for example, the backlight 16 is turned off such that light at a level at which the security system 80 would report the occurrence of an irregularity is not emitted. Here, structure may be formed such that a brightness level at which the security system 80 would report an irregularity cannot be set, or the backlight 16 may be controlled so as to light up at a brightness level lower than the brightness level at which the security system 80 would report an irregularity. Alternatively, the backlight may be kept lit at normal mode brightness and a display screen that is displayed at the operation/display section 14 inverted between black and white. For example, in the normal mode, a menu screen 74 as shown in FIG. 6A is displayed, but if the menu screen 74 emits light at or above the brightness level at which the security system 80 would report an irregularity, the operation/display section 14 may be controlled so as to display a menu screen 76 as shown in FIG. 6B, in which black and white are inverted and which emits light at a lower brightness than the brightness level at which the security system 80 would report an irregularity.

Here, the proportion of a white area of a screen when the screen is displayed in the normal mode may be calculated, and if this proportion is above a predetermined threshold, that is, if the proportion constitutes a brightness level at or above the predetermined threshold and the security system 80 would report an irregularity, the screen may be displayed at the operation/display section 14 with black and white inverted from the screen that is displayed in the normal mode.

Next, in step 204, predetermined processing speed control is implemented. Specifically, for example, the driving motor 46 is driven such that the polygon mirror 44 rotates at a lower rate of rotation per unit time than in the normal mode, such that noise emitted from the image forming device will be lower than a noise level at which the security system 80 would report an irregularity. Correspondingly, members for which a lowering of a function (rotation speed, linear speed or the like) is necessary in accordance with the lowering of the processing speed, such as a rotation rate per unit time of the photosensitive drum 50, a rotation rate per unit time of the intermediate transfer belt 58 and the like, are controlled so as to operate with functions lower than in the normal mode. Herein, structure may be such that a sound level at which the security system 80 reports an irregularity can be set, and the rotation speeds and the like of the members may be controlled so as to be quieter than that sound level.

In step 206, predetermined fixing control is performed. Specifically, the fixing apparatus 68 is controlled such that the temperature of the fixing apparatus 68 rises to a predetermined temperature more gradually than in the normal mode, such that the temperature inside the device will not rise rapidly and there will be no need to turn the ventilation fan 72 at high speeds.

In step 208, predetermined fan control is performed. Specifically, the ventilation fan 72 is controlled so as to operate at a predetermined rotation rate per unit time which is lower than in the normal mode. Here, the ventilation fan 72 may be controlled so as to be kept stopped.

In step 210, predetermined alert sound control is performed. Specifically, the alert sound output section 28 is controlled such that an alert sound that is emitted when a jam occurs or when a printing operation finishes or the like is at a lower level than in the normal mode. Here, structure may be such that the level of sound at which the security system 80 would report an irregularity can be set, and the alert sound output section 28 may be controlled such that alert sounds are quieter than that sound level.

Then, control returns to step 104 of FIG. 4 and, similarly to step 100, it is judged whether or not the current time is in the time period in which the security system 80 operates. If the current time is in that time period, control proceeds to step 106 and the image forming device 10 switches to the low-power mode. That is, the switches 14A, 16A, 18A and 20A are turned off in order to turn off power supplies to the operation/display section 14, the backlight 16, the scanner 18 and the image formation section 20.

On the other hand, if the current time is not in the time period in which the security system 80 operates, control proceeds to step 108, and the image forming device 10 switches into the normal mode. That is, instructions are given such that the above-mentioned image control, processing speed, fixing control, fan control and alert sound control operate in the normal mode.

For the present exemplary embodiment, a case has been described in which occurrence of an irregularity is reported if the security system 80 detects light and/or sound at predetermined levels. However, it is also possible, for example, when an irregularity is reported only if light at a predetermined level is detected, to control such that at least one of processing speed control, fixing control and fan control operates in the same manner as in the normal mode. Further, when an irregularity is reported only if the security system 80 detects sound at a predetermined level, it is possible to control such that, for example, the screen control operates in the same manner as in the normal mode.

Second Exemplary Embodiment

A second exemplary embodiment of the invention will be described. Structure of the device is the same as in the first exemplary embodiment, so will not be described.

Figure 7:
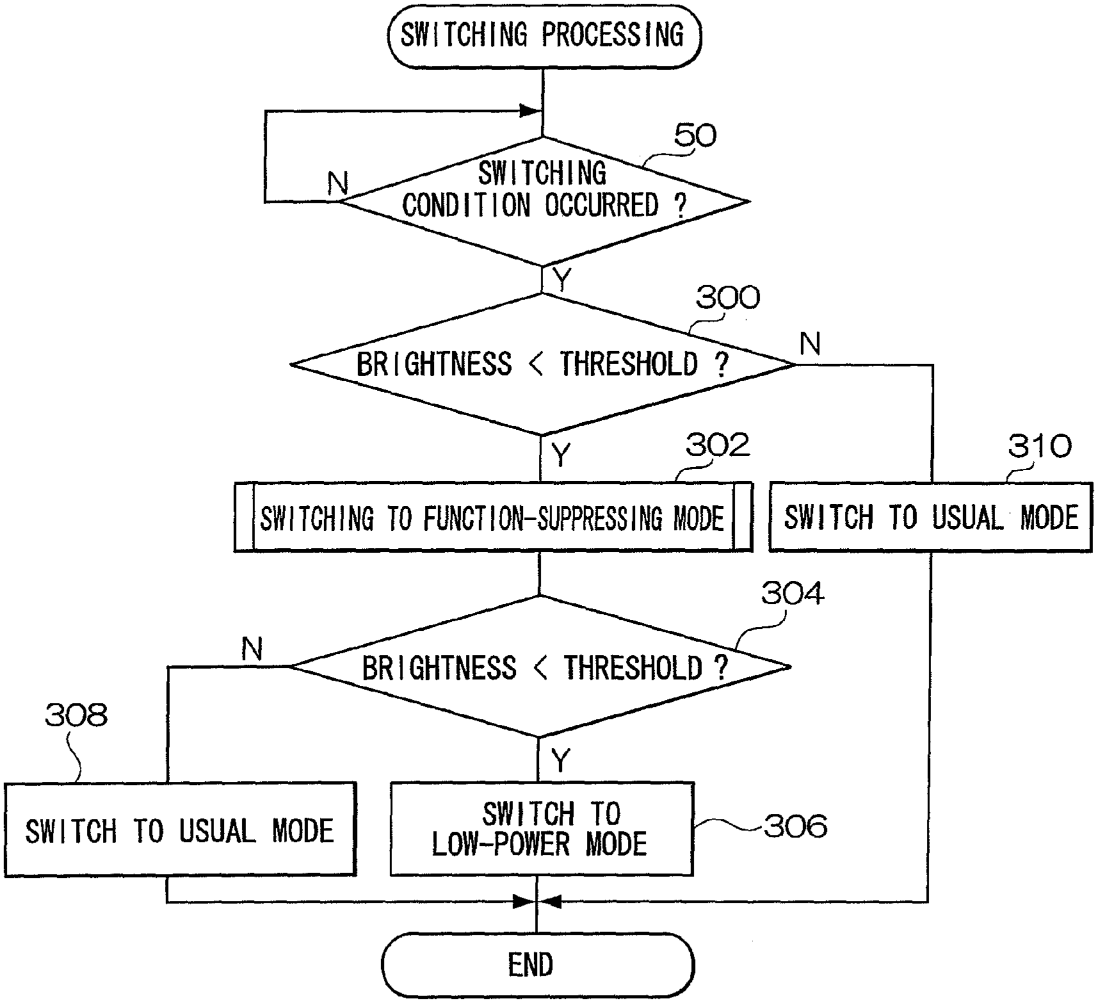
FIG. 7 is a flowchart of switching processing which is executed by a control section according to a second exemplary embodiment.

Operation of the present exemplary embodiment will be described with reference to the flowchart shown in FIG. 7 of control which is executed by the control section 12. The same as in the first exemplary embodiment, the control shown in FIG. 7 is executed when in the low-power mode. For the present exemplary embodiment, an example is described in which the low-power mode is on in a time period set by a user, and in the low-power mode, power supplies to the operation/display section 14, the backlight 16, the scanner 18 and the image formation section 20 are turned off.

The control shown in FIG. 7 differs from the control shown in FIG. 4 in the processing of steps 300 and 304. Other steps are similar to those in FIG. 4, so will not be described.

In step 300, it is judged whether or not a brightness of light detected by the external light detection sensor 26 is less than a predetermined level. The brightness referred to here may be a physical quantity relating to brightness, such as, for example, illuminance, intensity, light quantity or the like, and is not particularly limited. In the present exemplary embodiment, the predetermined level is set to, for example, a level at which it is possible to judge that it is nighttime, when the security system 80 would be operating. That is, the predetermined level is set to a level at which, if the detected light is below the predetermined level, it can be judged that it is nighttime and the security system 80 is operating, and if the detected light is at or above the predetermined level, it can be judged that it is daytime and the security system 80 is not operating.

Then, if the brightness of the detected light is at or above the predetermined level, that is, is a brightness at which it can be judged that the security system 80 is not operating, control proceeds to step 310 and the image forming device 10 switches into the normal mode. That is, the switches 14A, 16A, 18A and 20A are turned on, power is supplied from the power supply section 34 to the operation/display section 14, the backlight 16, the scanner 18 and the image formation section 20, and each section is instructed to operate in the normal mode. Hence, for example, the backlight 16 is lit with a maximum brightness, and the image formation section 20 is set so as to perform printing operations at normal speeds.

On the other hand, if the brightness of the light detected by the external light detection sensor 26 is less than the predetermined level, that is, is a brightness at which it can be judged that the security system 80 is operating, control proceeds to step 302 and the image forming device 10 switches into the function-suppressing mode.

In step 304, the same as in step 300, it is judged whether or not the brightness of the light detected by the external light detection sensor 26 is less than the predetermined level. Then, if the brightness of the detected light is less than the predetermined level, that is, is a brightness at which it can be judged that the security system 80 is operating, control proceeds to step 306 and the image forming device 10 switches into the low-power mode. That is, the switches 14A, 16A, 18A and 20A are turned off in order to turn off power supplies to the operation/display section 14, the backlight 16, the scanner 18 and the image formation section 20.

On the other hand, if the brightness of the detected light is at or above the predetermined level, that is, is a brightness at which it can be judged that the security system 80 is not operating, control proceeds to step 308 and the image forming device 10 switches into the normal mode. That is, instructions are given such that the above-described image control, processing speed, fixing control, fan control and alert sound control operate in the normal mode.

For the above exemplary embodiments, cases have been described in which the invention is applied to an image forming device that forms images with an electrophotography system. However, the invention is not limited to an electrophotography system but is also applicable to devices that form images on recording media with inkjets. Further, control of brightness of an operation/display section when switching from a low-power mode to a normal mode is not limited to an image forming device but is also applicable to, for example, a time-settable video recording device, air conditioning device or suchlike that switches from a low-power mode to a normal mode and realizes functions of the normal mode at a designated time.

Additionally, the exemplary embodiments described hitherto may be embodied by a program which implements the functions thereof with a computer structured by the control section (CPU) 12, ROM 29 and RAM 30 of the image forming device 10 of FIG. 2. Such a case may be an example in which the program is memorized at the ROM 29, and could be a case in which the program is stored and provided on a recording medium such as a CD-ROM or the like.

Third Exemplary Embodiment

Next, a third exemplary embodiment of the invention will be described. For this exemplary embodiment, a case will be described in which the security system 80 sends information relating to a time period of operation to the image forming device 10. Portions that are the same as in the above exemplary embodiments are assigned the same reference numerals, and will not be described in detail.

Figure 8:
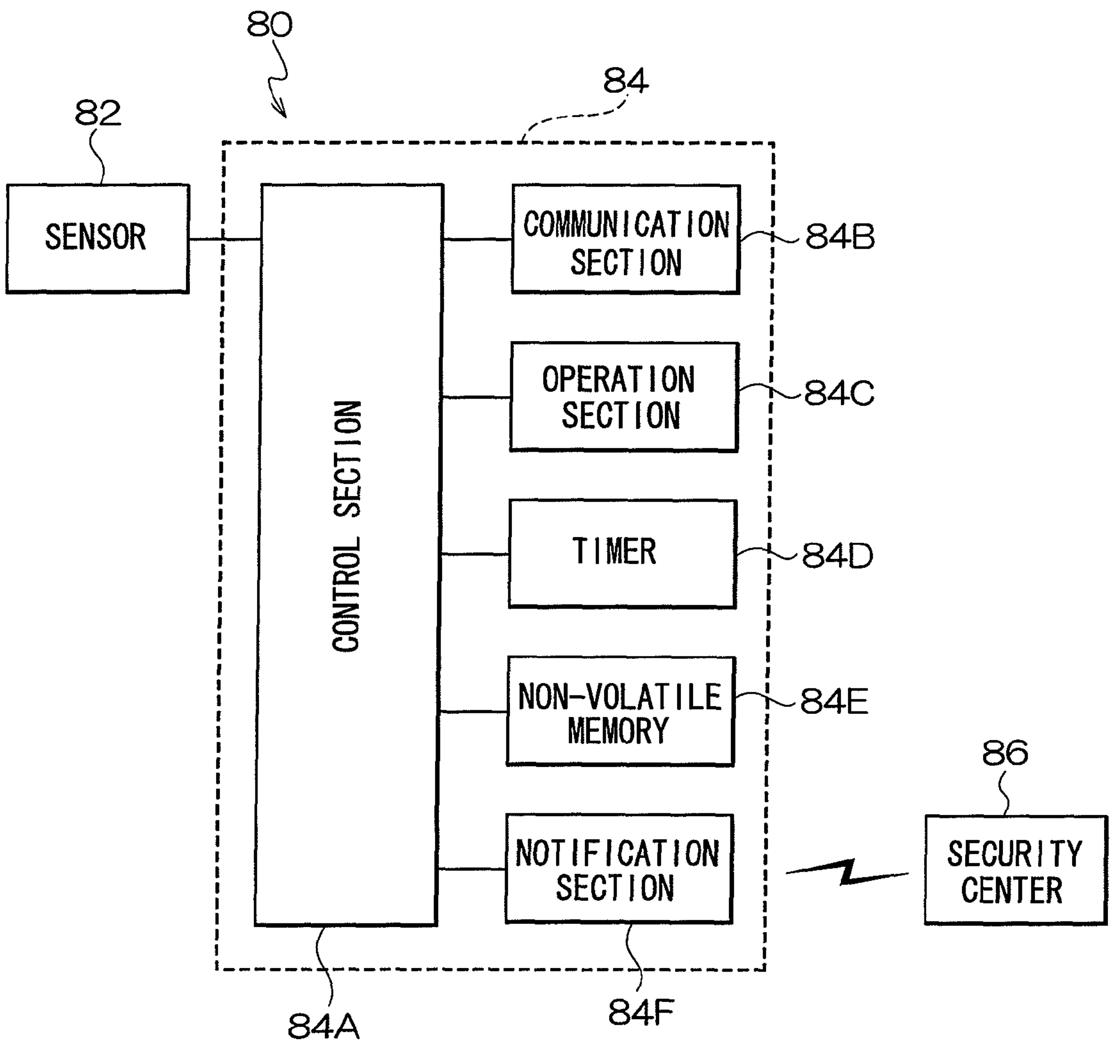
FIG. 8 is a schematic block diagram of a security system 80 according to a third exemplary embodiment.

FIG. 8 shows schematic structure of the notification device 84 of the security system 80. As shown in FIG. 8, the notification device 84 is structured to include a control section 84A, a communication section 84B, an operation section 84C, a timer 84D, a non-volatile memory 84E, a notification section 84F, and so forth. The control section 84A performs overall control of the various sections. The communication section 84B is connected to an unillustrated network such as a wireless LAN, a wired LAN or the like, and implements exchanges of various signals, information and the like with the image forming device 10, which is connected to the same network. The operation section 84C is for implementing various settings, such as a period of operation of the security system 80 and the like. The timer 84D acquires a current time. The non-volatile memory 84E memorizes the specified period of operation, and the like. The notification section 84F notifies the security center 86, via a wired or wireless communication circuit, when light and/or sound at or above predetermined levels are detected within the specified time period.

The period of operation of the security system 80 can be specified by a user operating the operation section 84C, and the specified period of operation is memorized in the non-volatile memory 84E.

Here, the communication section 84B is not limited to network communications using a LAN or the like, but may be structured to use a dedicated wireless or wired communications apparatus.

Next, operation of the present exemplary embodiment will be described with reference to the flowchart shown in FIG. 9 of control which is executed by the control section 84A of the notification device 84. The processing shown in FIG. 9 is executed, for example, at predetermined intervals.

Firstly, in step 400, it is judged whether or not an operation of setting the period of operation has been carried out by a user operating the operation section 84C. If the setting operation has been carried out, control proceeds to step 402 and the specified period of operation is memorized in the non-volatile memory 84E. On the other hand, if the setting operation has not been carried out, control proceeds to step 404.

Hence, the processing shown in FIG. 4 that was described for the first exemplary embodiment is executed at the image forming device 10, with only the processing of step 100 differing from the first exemplary embodiment. Specifically, in the present exemplary embodiment, the judgment in step 100 of whether or not the current time is in the period of operation of the security system 80 is implemented by an enquiry to the security system 80 via the network communications section 24.

Figure 9:
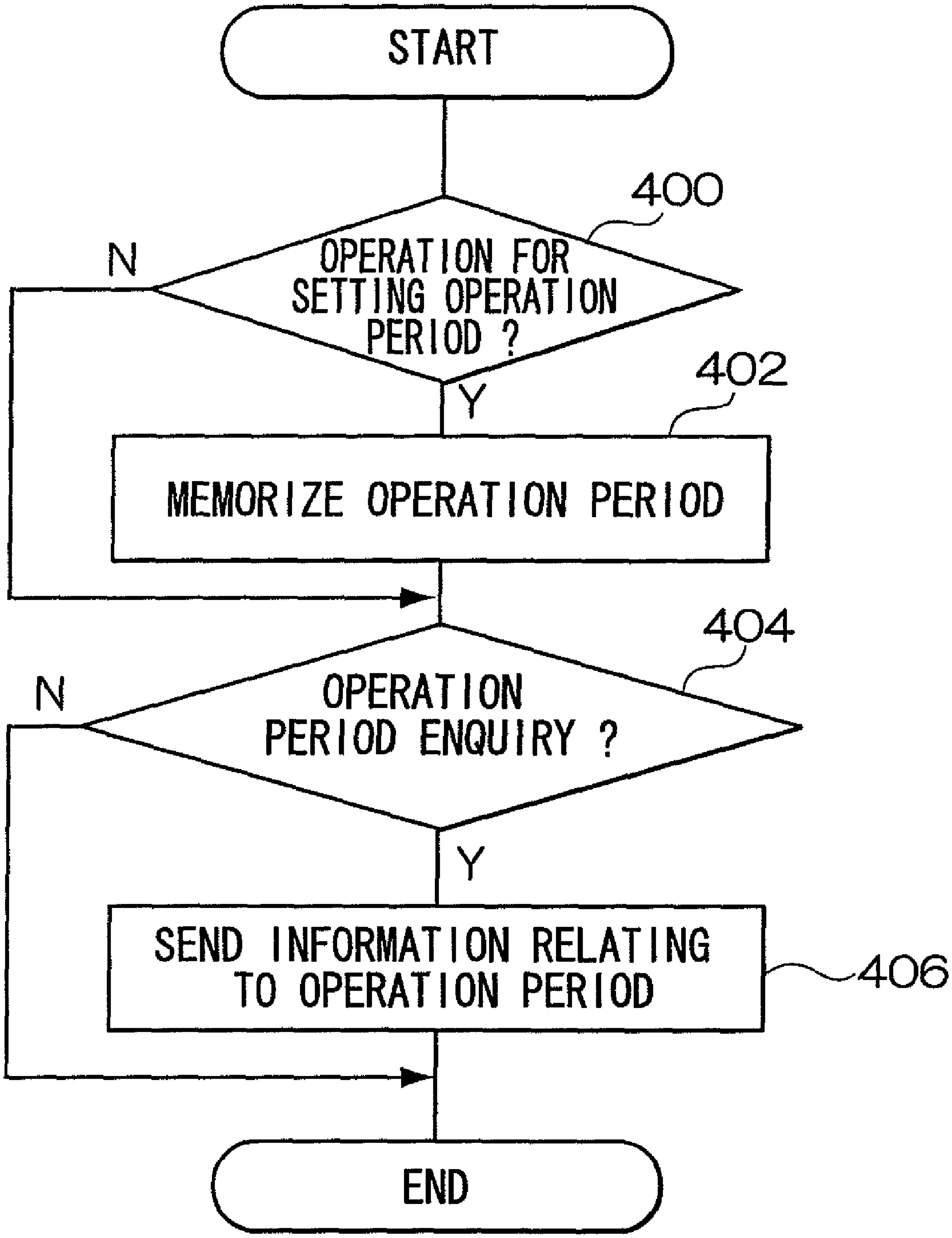
FIG. 9 is a flowchart of switching processing which is executed by the security system according to the third exemplary embodiment.

Accordingly, at the security system 80, in step 404 of FIG. 9, it is judged whether or not a signal sent from the image forming device 10 enquiring as to whether the security system 80 is in the period of operation has been received. If this signal has been received, control proceeds to step 406, and if the signal has not been received, the present routine ends.

In step 406, the timer 84D acquires the current time, and compares this with the period of operation memorized in the non-volatile memory 84E. Then, a signal indicating whether or not the current time is in the period of operation is sent to the image forming device 10 via the communication section 84B.

Hence, at the image forming device 10, the signal sent from the security system 80 is received by the network communications section 24, and it can be judged whether or not the current time is in the period of operation of the security system 80.

Thus, in the present exemplary embodiment, because the security system 80 sends information relating to the operating period of the security system 80 to the image forming device 10, the image forming device 10 can easily and reliably identify whether or not the security system 80 is in the period of operation.

Here, rather than the signal indicating whether or not the current time is in the period of operation being sent to the image forming device 10, information of the period of operation itself may be sent to the image forming device 10, such that the image forming device 10 judges whether or not the current time is in the period of operation of the security system 80.

Further, rather than the image forming device 10 sending requests to the security system 80 for information relating to the period of operation, such as a signal indicating whether or not the current time is in the period of operation or information of the period of operation itself or the like, the security system 80 may send information relating to the period of operation to the image forming device 10 periodically. Alternatively, information relating to the period of operation may be sent to the image forming device 10 at irregular intervals, such as, for example, the information of the period of operation being sent to the image forming device 10 whenever the period of operation is set in step 402 of FIG. 9, or the like.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to are suited to the particular use contemplated. It is intended that the scope of the invention be defined by the following claims and their equivalents.

What is claimed is:

1. An information processing device comprising:

a control section that determines whether an external security apparatus that detects a change in an environment of the information processing device, which results from operation of at least one function of the information processing device, is in operation;

a power control section that, in response to the control section determining that the external security apparatus is in operation, controls the information processing device to operate in a reduced operating mode in which the at least one function of the information processing device is suppressed; and a time assignment section that assigns a period in which the external security apparatus is in operation.

2. The information processing device according to claim 1, further comprising a display section that displays at least one of an operation state and a setting state of the information processing device, wherein the at least one function comprises a brightness of the display section.

3. The information processing device according to claim 1, further comprising a light scanning section that scans light in accordance with image information for forming an image, wherein the at least one function comprises an operation speed of the light scanning section.

4. The information processing device according to claim 2, further comprising a light scanning section that scans light in accordance with image information for forming an image, wherein the at least one function comprises an operation speed of the light scanning section.

5. The information processing device according to claim 1, further comprising:

a fixing section that fixes an image which has been formed on a recording medium; and a ventilation section that lowers a temperature inside the information processing device in response to a temperature increase inside the information processing device by operation of the fixing section, and wherein the at least one function comprises a rotation speed of the ventilation section.

6. The information processing device according to claim 2, further comprising:

a fixing section that fixes an image which has been formed on a recording medium; and a ventilation section that lowers a temperature inside the information processing device in response to a temperature increase inside the information processing device by operation of the fixing section, and wherein the at least one function comprises a rotation speed of the ventilation section.

7. The information processing device according to claim 3, further comprising:

a fixing section that fixes an image which has been formed on a recording medium; and a ventilation section that lowers a temperature inside the information processing device in response to a temperature increase inside the information processing device by operation of the fixing section, and wherein the at least one function comprises a rotation speed of the ventilation section.

8. The information processing device according to claim 4, further comprising:

a fixing section that fixes an image which has been formed on a recording medium; and a ventilation section that lowers a temperature inside the information processing device in response to a temperature increase inside the information processing device by operation of the fixing section, and wherein the at least one function comprises a rotation speed of the ventilation section.

9. An information processing device comprising:

a control section that determines whether an external security apparatus that detects a change in an environment of the information processing device, which results from operation of at least one function of the information processing device, is in operation;

a power control section that, in response to the control section determining that the external security apparatus is in operation, controls the information processing device to operate in a reduced operating mode in which the at least one function of the information processing device is suppressed; and an external light detection section that detects external light in the environment around the information processing device, wherein the control section determines that the external security apparatus is in operation if the external light detected by the external light detection section is less than a predetermined level.

10. The information processing device according to claim 2, further comprising an external light detection section that detects external light in the environment around the information processing device, wherein the control section determines that the external security apparatus is in operation if the external light detected by the external light detection section is less than a predetermined level.

11. A method of controlling an information processing device, comprising:

assigning a period in which the external security apparatus is in operation;

determining whether an external security apparatus that detects a change in an environment of the information processing device that results from operation of at least one function of the information processing device is in operation, based on the assigned period;

controlling the information processing apparatus to operate in a reduced operating mode in which the at least one function of the information processing device is suppressed, in response to determining that the external security apparatus is in operation.

12. The method of controlling an information processing device according to claim 11, wherein the controlling comprises displaying at least one of an operation state and a setting state of the information processing device and suppressing a brightness of the displayed at least one of the operation state and the setting state of the information processing device.

13. A security system comprising:
- an external security apparatus comprising a transmission section that sends information relating to a time period of operation thereof; and
- an information processing device comprising
- a reception section that receives the information relating to the time period of operation of the external security apparatus,
- a power control section that switches between a predetermined mode and a low-power mode on the basis of a pre-specified setting condition relating to power consumption of the information processing device, the low-power mode being lower in a power consumption quantity than the predetermined mode, and
- a function-suppressing section that, when switching from the low-power mode to the predetermined mode in the time period of operation of the external security apparatus, suppresses at least one function of the information processing device in the predetermined mode.

14. The security system according to claim 13, wherein the information processing device further comprises a display section that displays at least one of an operation state and a setting state of the information processing device, and
- the function-suppressing section suppresses a brightness of the display section relative to the predetermined mode.

15. A computer readable medium storing a program causing a computer to execute a process for controlling an information processing device, the process comprising:
- assigning a period in which the external security apparatus is in operation;
- determining whether an external security apparatus that detects a change in an environment of the information processing device that results from operation of at least one function of the information processing device is in operation, based on the assigned period;
- controlling the information processing apparatus to operate in a reduced operating mode in which the at least one function of the information processing device is suppressed, in response to determining that the external security apparatus is in operation.

16. The computer readable medium storing a program causing a computer to execute a process for controlling an information processing device according to claim 15, wherein the controlling comprises displaying at least one of an operation state and a setting state of the information processing device and suppressing a brightness of the displayed at least one of the operation state and the setting state of the information processing device.

* * * * *